(12) United States Patent
Packer et al.

(10) Patent No.: US 8,701,359 B2
(45) Date of Patent: Apr. 22, 2014

(54) CAST STRUCTURAL CONNECTORS

(76) Inventors: Jeffrey Alan Packer, Toronto (CA); Constantin Christopoulos, Toronto (CA); Juan-Carlos De Oliviera, Toronto (CA)

(*) Notice: Subject to any disclaimer, the term of this patent is extended or adjusted under 35 U.S.C. 154(b) by 360 days.

(21) Appl. No.: 11/741,315

(22) Filed: Apr. 27, 2007

(65) Prior Publication Data

US 2007/0253766 A1 Nov. 1, 2007

Related U.S. Application Data

(60) Provisional application No. 60/795,170, filed on Apr. 27, 2006.

(51) Int. Cl.
*E04B 1/98* (2006.01)
(52) U.S. Cl.
USPC .......... 52/167.3; 52/655.1; 52/656.9; 52/657; 403/270; 403/302
(58) Field of Classification Search
USPC ............ 52/657, 167.3, 253, 291, 638, 655.1, 52/656.9, 695; 403/108, 302, 306, 379.1, 403/265–272
See application file for complete search history.

(56) References Cited

U.S. PATENT DOCUMENTS

| RE6,488 | E | * | 6/1875 | Van Duzer | 285/133.11 |
|---|---|---|---|---|---|
| 297,333 | A | * | 4/1884 | Adams | 52/123.1 |
| 1,849,273 | A | * | 3/1932 | Broderick | 52/653.2 |
| 2,037,736 | A | | 4/1936 | Payne et al. | |
| 2,883,216 | A | * | 4/1959 | Nock | 403/302 |
| 3,685,866 | A | | 8/1972 | Patenaude | |
| 3,688,461 | A | * | 9/1972 | Rensch et al. | 52/653.1 |
| 3,988,872 | A | | 11/1976 | Adamson et al. | |
| 4,261,149 | A | * | 4/1981 | Gustafson | 52/292 |

(Continued)

FOREIGN PATENT DOCUMENTS

| JP | 61-28645 | 2/1986 |
|---|---|---|
| JP | 61-184005 | 11/1986 |

(Continued)

OTHER PUBLICATIONS

American Psychological Association (APA): gusset. (n.d.). Dictionary.com Unabridged. Retrieved Jul. 15, 2010, from Dictionary.com website: http://dictionary.reference.com/browse/gusset.*

*Primary Examiner* — Basil Katcheves
*Assistant Examiner* — Joshua Ihezie
(74) *Attorney, Agent, or Firm* — Miller Thomson LLP; Eugene Gierczak; Eduardo Krupnik

(57) ABSTRACT

A cast structural connector connects a structural member, such as a hollow structural section (HSS) or wide flange (W) section member, to a structural frame. The connector is particularly suited for lateral bracing and includes a first end configured to receive the structural member and be welded to the structural member, a second end for connecting to the structural frame, and an intermediate portion. The first end includes beveling allowing compatibility with structural members of varying sizes and enabling complete joint penetration welding thereby developing the full axial strength of the structural member. The intermediate portion provides for transmission of forces as the frame deforms, for example, under severe seismic conditions, and can include a flexural plastic hinge portion. The connector can be welded to the structural frame or connected by a standard fabricated end connection, such as a gusset plate. Casting manufacturing allows for mass production of the connector.

21 Claims, 13 Drawing Sheets

(56) References Cited

U.S. PATENT DOCUMENTS

| | | | |
|---|---|---|---|
| 4,304,078 A | 12/1981 | Meriwether, Jr. | |
| 4,409,765 A * | 10/1983 | Pall | 52/167.1 |
| 4,476,662 A * | 10/1984 | Fisher | 52/693 |
| 4,551,960 A | 11/1985 | Fleishman | |
| 4,577,449 A | 3/1986 | Celli | |
| 4,622,795 A * | 11/1986 | Codd | 52/655.1 |
| RE32,892 E * | 3/1989 | Simons | 219/137 WM |
| 5,014,381 A * | 5/1991 | Eddy | 14/78 |
| 5,190,207 A * | 3/1993 | Peck et al. | 228/170 |
| 5,269,394 A | 12/1993 | Haroldson, Sr. | |
| 5,368,106 A * | 11/1994 | Coughlin | 169/70 |
| 5,441,241 A * | 8/1995 | McKim | 256/65.1 |
| 5,498,094 A * | 3/1996 | Imai | 403/171 |
| 5,626,434 A * | 5/1997 | Cook | 403/176 |
| 5,630,622 A * | 5/1997 | Kirschenmann et al. | 280/756 |
| 5,632,685 A * | 5/1997 | Myers | 464/183 |
| 5,651,417 A * | 7/1997 | Coughlin | 169/51 |
| 5,806,265 A | 9/1998 | Sluiter | |
| 5,819,484 A * | 10/1998 | Kar | 52/167.3 |
| 5,967,693 A * | 10/1999 | Braaten et al. | 403/383 |
| 6,059,482 A | 5/2000 | Beauvoir | |
| 6,062,982 A * | 5/2000 | Cartwright | 464/113 |
| 6,073,405 A | 6/2000 | Kasai et al. | |
| 6,102,605 A | 8/2000 | Emmons | |
| 6,282,862 B1 | 9/2001 | Weeks | |
| 6,474,902 B1 | 11/2002 | Beauvoir | |
| 6,516,583 B1 * | 2/2003 | Houghton | 52/655.1 |
| 6,591,571 B2 * | 7/2003 | Fritsche et al. | 52/655.1 |
| 6,758,022 B1 * | 7/2004 | Coll et al. | 52/690 |
| 6,802,844 B2 * | 10/2004 | Ferree | 606/258 |
| 6,851,232 B1 | 2/2005 | Schwegler | |
| 6,855,061 B2 * | 2/2005 | Simboli | 464/182 |
| 7,174,680 B2 * | 2/2007 | Smelser | 52/167.3 |
| 7,178,296 B2 * | 2/2007 | Houghton | 52/261 |
| 7,213,379 B2 * | 5/2007 | Carlson et al. | 52/837 |
| 7,225,588 B2 * | 6/2007 | Nakamura et al. | 52/167.3 |
| 2003/0205008 A1 * | 11/2003 | Sridhara | 52/167.3 |
| 2004/0049993 A1 | 3/2004 | Saldana | |
| 2004/0146340 A1 * | 7/2004 | Smith | 403/265 |
| 2005/0005539 A1 * | 1/2005 | Nakamura et al. | 52/167.3 |
| 2005/0144792 A1 * | 7/2005 | Ritter | 30/392 |
| 2005/0163564 A1 * | 7/2005 | Tuell | 403/403 |
| 2005/0229509 A1 * | 10/2005 | Majlessi | 52/167.3 |
| 2006/0137284 A1 | 6/2006 | Window | |
| 2006/0193687 A1 | 8/2006 | Ghosh | |
| 2007/0011983 A1 * | 1/2007 | Reynolds et al. | 52/633 |
| 2007/0245643 A1 * | 10/2007 | Ichikawa et al. | 52/167.3 |

FOREIGN PATENT DOCUMENTS

| | | |
|---|---|---|
| JP | 3-35762 | 7/1991 |
| JP | 2000-204671 | 7/2000 |
| JP | P2004-270319 | 9/2004 |
| JP | 2005-282144 | 10/2005 |

* cited by examiner

CAST STRUCTURAL CONNECTORS

This application claims the benefit of U.S. Provisional Application No. 60/795,170, filed 27 Apr. 2006.

FIELD OF THE INVENTION

This invention relates to structural connections and members for use in the construction industry. The present invention in particular relates to cast structural connectors and members for static, quasi-static and dynamic loading applications.

BACKGROUND OF THE INVENTION

Concentrically braced frames are a particularly popular choice for the lateral force resisting systems of steel structures because of their design simplicity, their low cost, the ease with which they are constructed, and the increased stiffness they provide over other lateral load resisting systems. The diagonal brace members of braced frames are subject to predominately axial forces, and in the event of a severe earthquake, seismic energy is dissipated through the cyclic yielding in tension and inelastic buckling in compression of the brace members. Typical bracing members include angles, channels, wide flange (W) sections, and rectangular and circular hollow sections.

Hollow structural sections (HSS) in particular are a common selection for lateral bracing members because of their efficiency in carrying compressive loads, their improved aesthetic appearance, and because of the wide range of section sizes that are readily available. Further, HSS have been used extensively in seismic applications to dissipate energy. Round HSS in particular have enhanced performance over rectangular HSS because of reduced residual stress concentrations.

Hollow structural sections are efficient members for carrying axial loads, however their connections are generally cumbersome, expensive, and can be difficult to design when they are used in demanding situations, including seismic applications. As well, the need for designing and constructing buildings taking into consideration seismic loads is also becoming more prevalent. Specifically, bracing is being used more often and this bracing needs to be able to withstand cyclic inelastic loading of the bracing in tension and compression.

Previously devised connectors have been focused on the residential or lightweight construction industries, providing "quick and easy" type connections not readily applicable to brace members under seismic conditions.

For example, U.S. Patent Application Publication No. 2005/0163564 to Tuell describes a construction system with interlocking connectors formed of a plate material. Although these connectors allow flexibility in assembling a structure, they may suffer undesirable connection failures during seismic loading.

Casting is a manufacturing approach that allows versatility and geometric freedom in designing a load-bearing metallic element having controlled dimensions and pre-determined performance characteristics. Because of this, the use of cast materials as structural elements is known.

For example, U.S. Pat. Nos. 6,059,482 and 6,474,902 to Beauvoir describe a bolted connector having a bulkhead for connection between a column and a beam. However, these prior art connectors are only designed to provide moment connection between a beam and column, and are not specifically designed for seismic applications. In particular, the design of these connectors does not allow for controlled yielding or developing the full strength of a bracing member.

Accordingly it would be advantageous to provide connectors for bracing members that can be mass-customized. Further it would be advantageous to provide connectors compatible with bracing members of different sizes and configurations. Still further it would be advantageous to provide connectors operable to develop the full strength of a bracing member under seismic conditions.

SUMMARY OF THE INVENTION

The present invention provides cast connectors for use in a structural frame.

In one aspect, the present invention is a cast structural connector for use in a brace assembly for a structural frame, the brace assembly including a brace member such as a hollow structural section (HSS) or wide flange (W) section, the connector comprising: a first end configured to receive the brace member and be welded to the brace member; a second end adapted to be fixed to the structural frame; and an intermediate portion disposed between the first end and second end; wherein the first end includes a bevel enabling complete joint penetration welding between the first end and the brace member.

The structural section can be HSS or W-section structural members, for example. In the case of HSS, the bevel on the distal end of the first end has dimensions equal to or smaller than the inside dimensions of the HSS. In the case of a W-section, bevelled distal edges have dimensions equal to or smaller than dimensions between the flange portions of the W-section. Therefore, according to this aspect, the bevel enables the connector to receive and be welded to structural members of varying dimensions. The bevel further enables complete joint penetration groove welding between the first end and the hollow structural section thereby developing the full axial strength of the hollow structural section in severe seismic conditions.

In another aspect, the connector of the present invention can be connected to a structural frame directly, i.e. by means of bolting or welding, or via a standard fabricated end connection, such as a gusset plate for example.

Although static applications are of course possible (to columns, to bracings, in trusses, etc.), the connector of the present invention is particularly well suited for implementation in seismic load resistant braced frames. In such bracing applications, the intermediate portion provides predominately axial transmission of forces and incidental moments as the frame deforms. Casting manufacturing allows for the mass production of such connectors operable for connection to a range of member sizes. The bracing will provide varying load-bearing capacity depending on the geometric properties of the hollow structural section or W-section member.

Further features of the invention will be described or will become apparent in the course of the following description.

BRIEF DESCRIPTION OF THE DRAWINGS

A detailed description of the preferred embodiments is provided herein below by way of example only and with reference to the following drawings, in which.

Figure 1C:
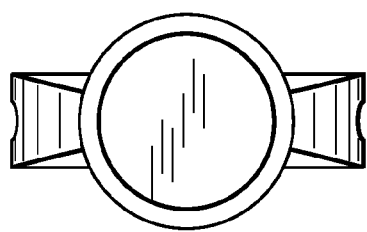
FIGS. 1A, 1B, 1C and 1D are a top view, side view, end view and perspective view, respectively, of an embodiment of the connector of the present invention.
Figure 1D:
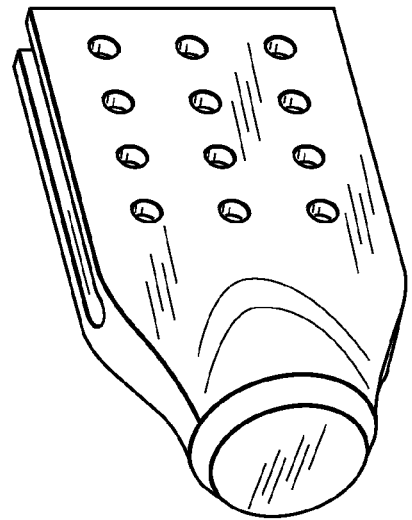
Figure 1A:
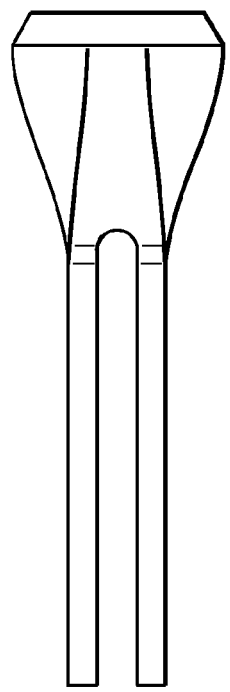
Figure 1B:
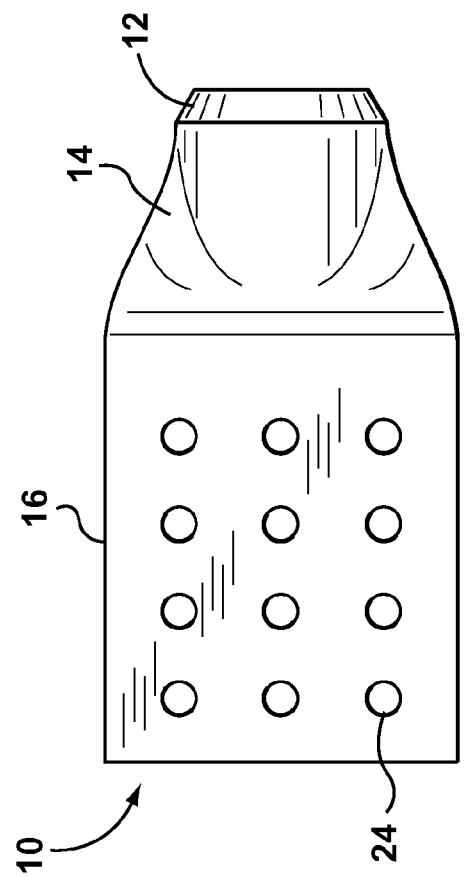

It is to be expressly understood that the description and drawings are only for the purpose of illustration and as an aid to understanding, and are not intended as a definition of the limits of the invention.

DETAILED DESCRIPTION OF THE INVENTION

The connectors of the present invention are best understood as an intermediate connector between an axially-loaded bracing member and a standard bolted or welded connection directly to a structural frame or to a standard fabricated end connection connected to the structural frame, such as a gusset plate. The bracing member can be, for example, a HSS, which is commonly used as a lateral bracing member in seismic bracing applications. The HSS can be of various dimensions and cross-sectional shapes, including, circular, rectangular, square, oval, or elliptical, to name a few. The bracing member can also be a W-section member, discussed below.

The connectors can be used in static, quasi-static or dynamic loading applications, wherein "dynamic applications" include fatigue, cyclic, seismic, impulsive, blast and impact loadings. The connectors are also operable to provide a load-bearing function in static applications with axial loading of structural members, such as columns, bracings, trusses, space frames, etc. The connectors are particularly directed to seismic-resistant bracing applications where the connector develops the full capacity of a brace member under severe seismic conditions. What is meant by "severe seismic conditions" is repeated cycles of tension yielding and inelastic buckling, including the increase in strength that is expected as the brace member reaches large inelastic strains (i.e. the overstrength).

The connectors of the present invention are particularly useful as mass-customized cast steel or other cast metal connectors for predominately axially-loaded members. Casting manufacturing enables the geometric freedom to design a cast steel connector that fits between a HSS brace member and a single gusset plate (as an example) to develop the full axial strength of the brace member. The connector itself can be shaped to accommodate any standard HSS section of a given outer diameter (i.e. variable wall thickness) with a pre-qualified complete joint penetration (CJP) groove weld to the tube.

The benefits of this connection are numerous. First, provided that an appropriate weld electrode is selected and an appropriate welding procedure, according to well known methodologies, is followed, the resulting CJP groove weld between the HSS or W-section and the connector is stronger than the brace member for the range of overstrength that is expected in such structural members. Further, the bevelled edge on the casting allows for the same welding protocol to be used for a brace member of varying thickness. Generally speaking, HSS having approximately 100-500 mm outer diameter and 3.2-16.0 mm wall thickness are suitable for seismic applications. Since each connector can fit a range of section sizes, a small number of connectors—one for each standard tube outer diameter—would cover a range of brace options, thus one or two connector types can be used throughout an entire building structure with the appropriate storey shear being achieved by varying the wall thickness of the brace.

An additional benefit of the cast connector design of the present invention is that since casting manufacturing is predisposed to mass production, the cost per connector can be dramatically reduced with repetition, undercutting the cost of individually designing, detailing, and fabricating the reinforced, fabricated HSS-to-gusset connections. The improved aesthetics of the compact and streamlined connector also promote its use in architecturally exposed steel applications.

Attachment of the other end of the connector either directly to the structural frame or to one or more gusset plates attached to the structural frame accommodates simple fabrication, construction, and site erection. Furthermore, leaving a gap between the end of the connector and any structural element ensures that the flexural plastic hinge that forms at the brace end during compressive buckling will occur in the gusset plate rather than in the brace.

Alternatively, the connector can include a plastic hinge portion located away from the gusset plate allowing the formation of a flexural plastic hinge induced during compressive brace buckling to occur in the cast connector rather than in the connected gusset plate, as discussed below.

The connector of the present invention is intended to develop the full axial capacity of, or any particular design load in, a connected structural steel member. One end of the cast connector can be designed to couple with any typical standard fabricated structural connection, such as a gusset plate of standardized dimensions, or be welded directly to the structural frame, for example, at a beam-column intersection or along a truss. The other end of the connector is designed to connect to a range of brace members of various sizes. For HSS, the connector is compatible with a given outer geometry but of variable wall thickness. For W-sections, the connector is compatible with a given web height but of variable flange and web thicknesses. This particular feature allows for mass-customization of connectors.

As shown in FIGS. 1A to 1D, a connector 10 includes a first end 12, an intermediate portion 14 and a second end 16. Connection to the structural member is achieved using the first end 12.

Figure 2A:
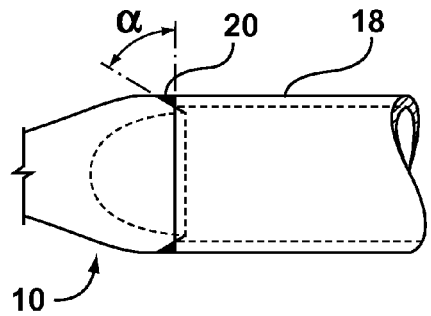
FIGS. 2A and 2B are side views showing a connector with a thick hollow structural section and a thin hollow structural section, respectively.
Figure 2B:
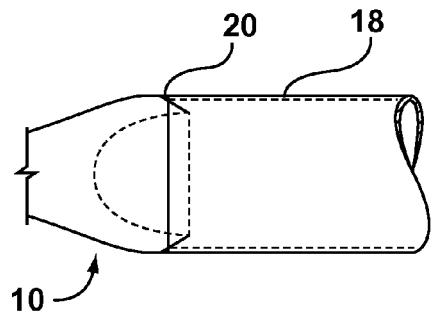
Figure 3:
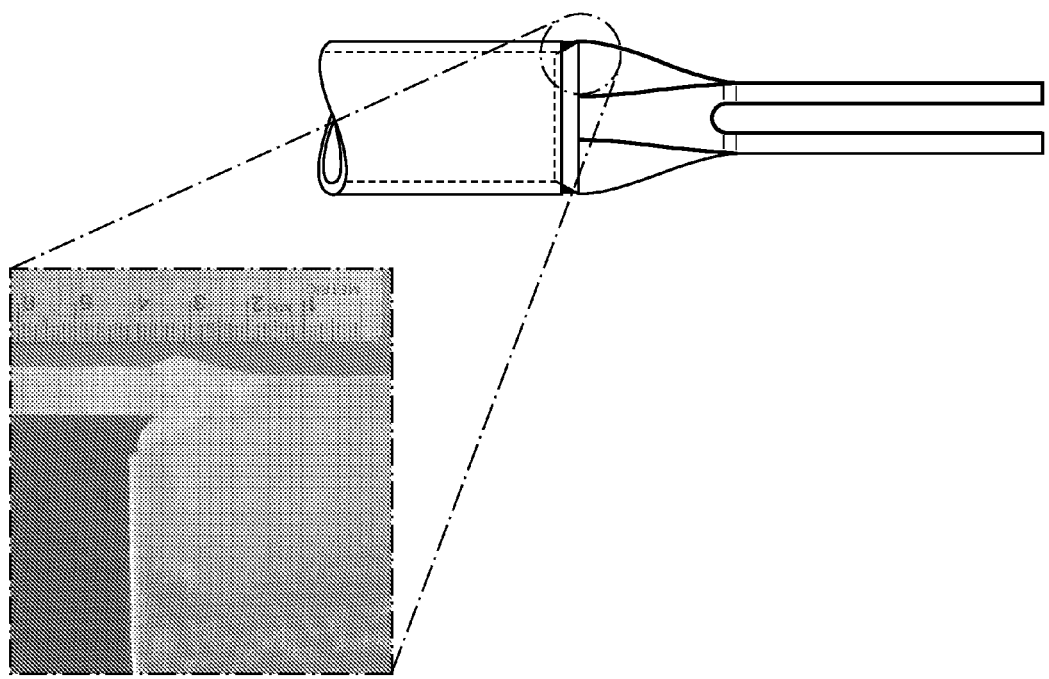
FIG. 3 is a side view of a connector and a brace member featuring a zoomed section micrograph of a polished and etched complete penetration joint weld.
Figure 4B:
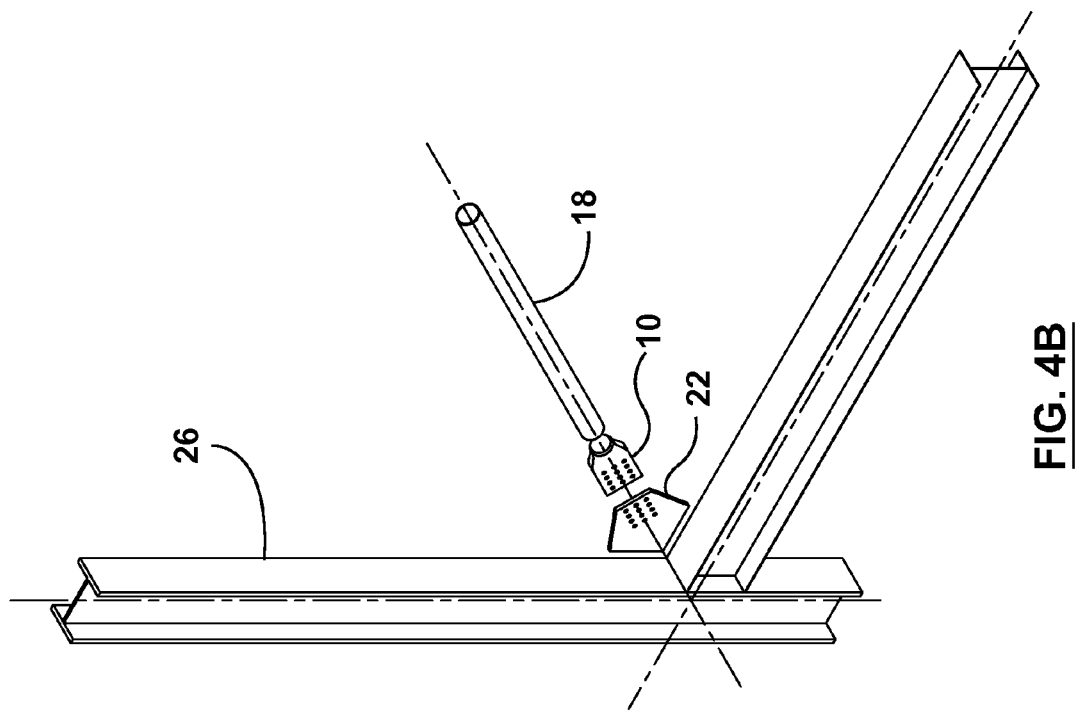
FIGS. 4A and 4B are a side exploded view and a perspective exploded view, respectively, of a connector in combination with a brace member and gusset plate.
Figure 4A:
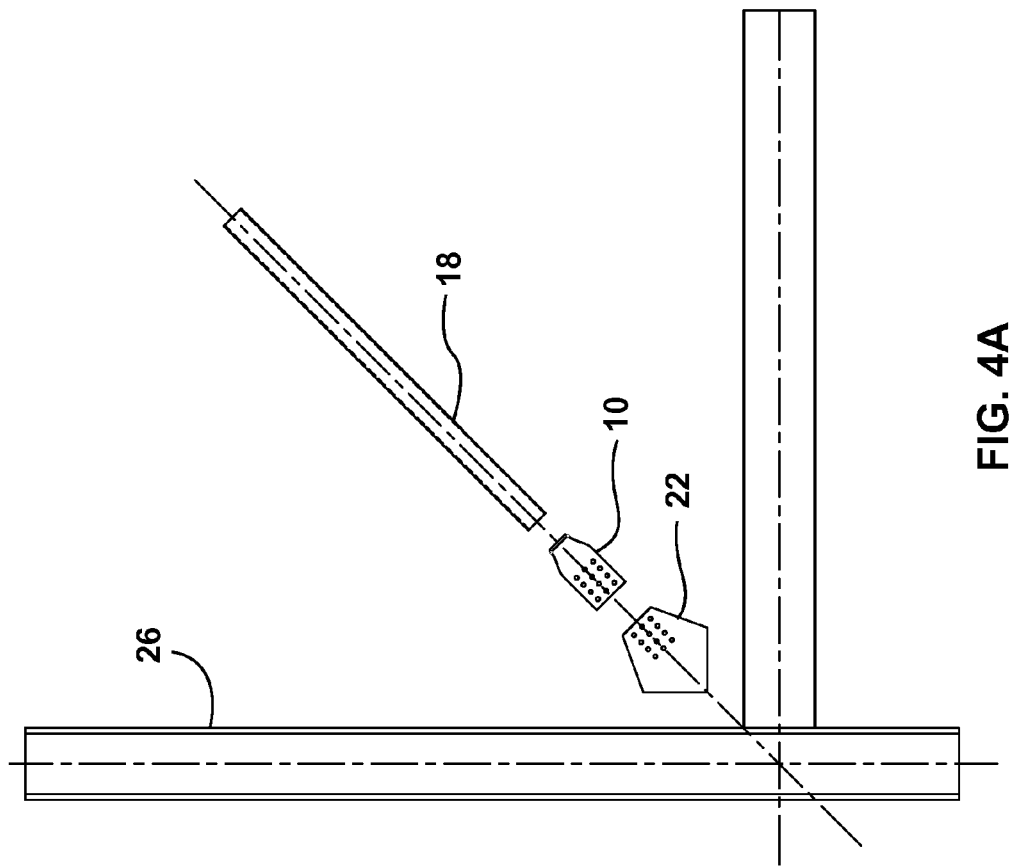

The first end 12 is chamfered or bevelled at a distal end so that it can be used with corresponding structural member 18 of different thicknesses, as can best be seen in FIGS. 2A and 2B. In this case, the structural member is a HSS brace member. The angle of the bevel, $\alpha$, can be selected so that a groove weld produces a weld portion 20 which is of sufficient volume to effect a good weld, preferably 45 to 60 degrees. In particular, the bevel in the first end 12 enables complete joint penetration groove welding between the first end 12 and a brace member. A complete joint penetration groove weld develops the full axial capacity of a given brace member under severe seismic conditions. The bevel in the first end 12 also facilitates alignment and centering with the brace member. FIG. 3 illustrates a polished and chemically etched section cut through the CJP groove weld between a connector and a HSS 168×9.5 mm brace member.

One advantage of the present invention is that the connector 10 may be attached to the structural member 18 on or off site. Generally speaking a weld that need not be made on site is a better weld with more reliable properties.

The connector 10 has a second end 16 that is adapted to be bolted to one or more standard fabricated end connections 22 as can best be seen in FIGS. 4A, 4B, 5A and 5B. The second end 16 may have a plurality of holes 24 (FIG. 1A) therein adapted to receive bolts when connected to standard fabricated end connections 22, such as a gusset plate. The end connections 22 enable the bracing member 18 to be attached to the structural frame 26 to be braced.

Alternatively, the second end 16 may be adapted to be welded to one or more standard fabricated end connections and in that instance no holes would be required (not shown). Furthermore, the second end 16 may be adapted to be welded directly to the structural frame 26, whether directly to a beam-column intersection, to a truss, directly to a beam or column, etc.

The intermediate portion 14 is shown to include a gradual slope or curvature from the first end 12 to the second end 16, improving castability and allowing for the gradual dispersion of forces between the brace member 18 and the end connection 22.

Figure 5A:
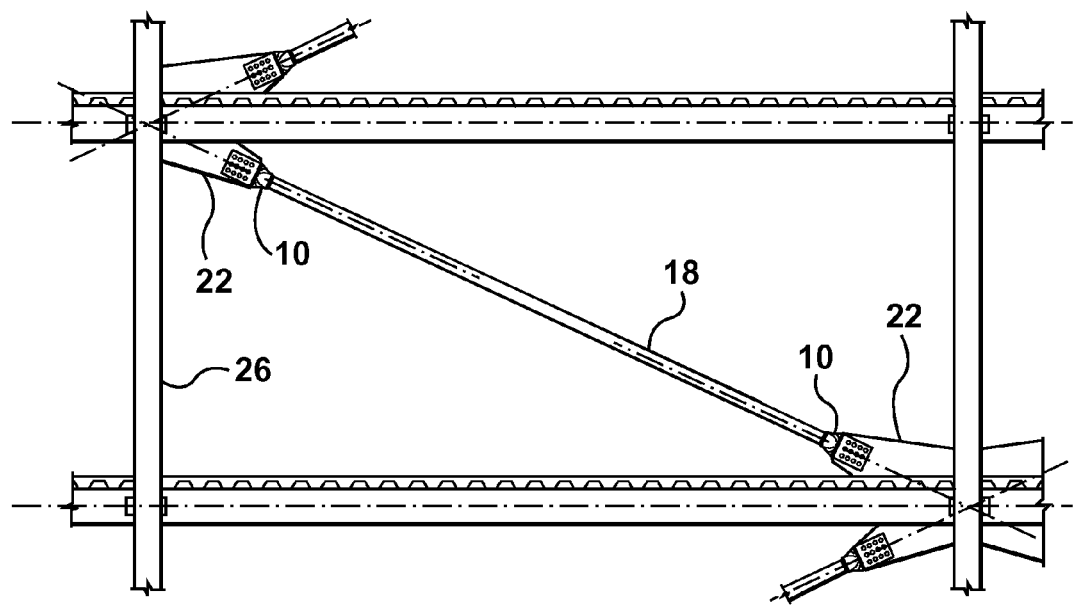
FIGS. 5A and 5B are a side view and an enlarged perspective view, respectively, of a connector connecting a brace member to a frame.
Figure 5B:
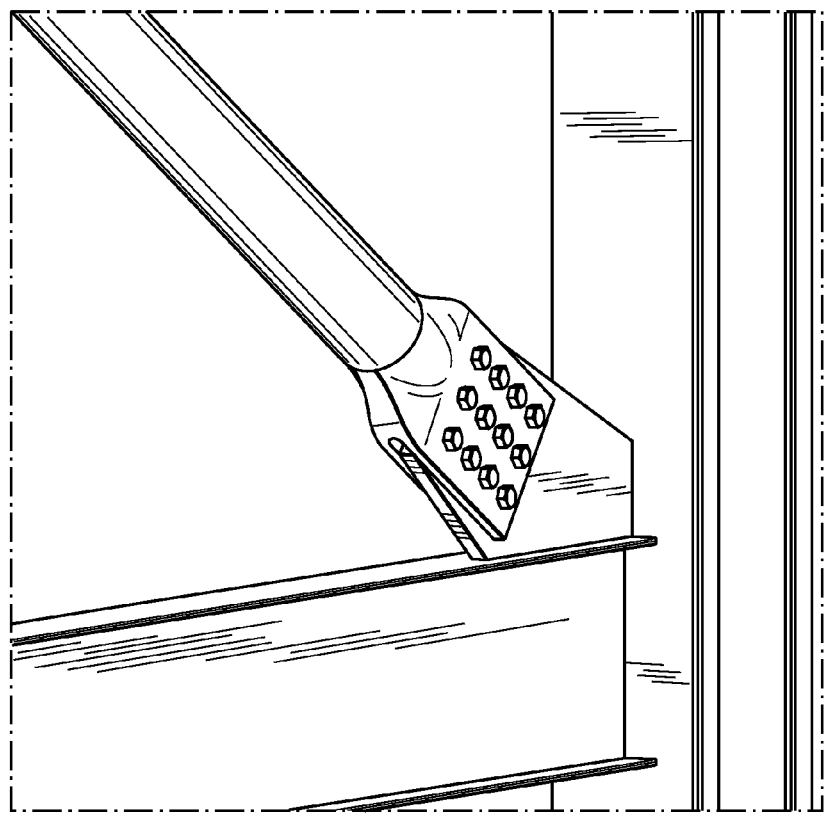

As shown in FIG. 5A, two cast connectors 10 can be shop-welded to the ends of a brace member 18 allowing for bolted installation of the brace-connector assembly in the building frame 26. In FIG. 5B the cast connector is shown connected to a standard fabricated end connection located in a beam-column intersection of the structural frame.

It should be understood that the configuration of the second end 16, namely the thickness, the number and orientation of holes 24 adapted to receive bolts when connected to standard fabricated end connections 22, will vary greatly depending on the particular axial loading capacity requirements and dimensions of the connector 10.

As will be appreciated by those skilled in the art this connection can be used with hollow structural sections of different thicknesses. Further this connection allows for erection tolerances in length and angle of the brace while still connecting to a circular, square, rectangular and elliptical or oval hollow section without requiring profiling, beveling or chamfering of the structural member.

Figure 6:
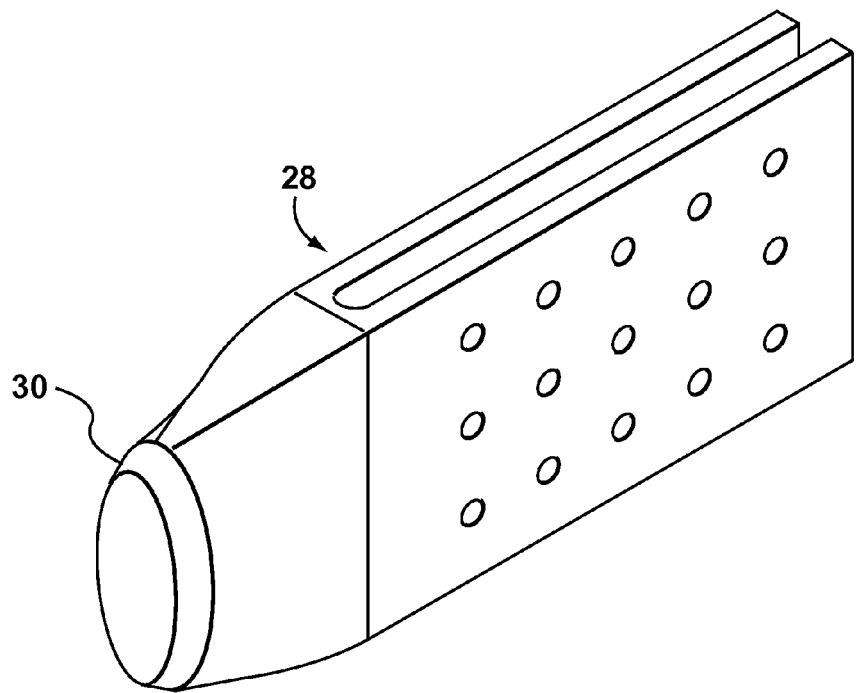
FIG. 6 is a perspective view of a connector for use with a brace member having an oval cross-section.
Figure 7:
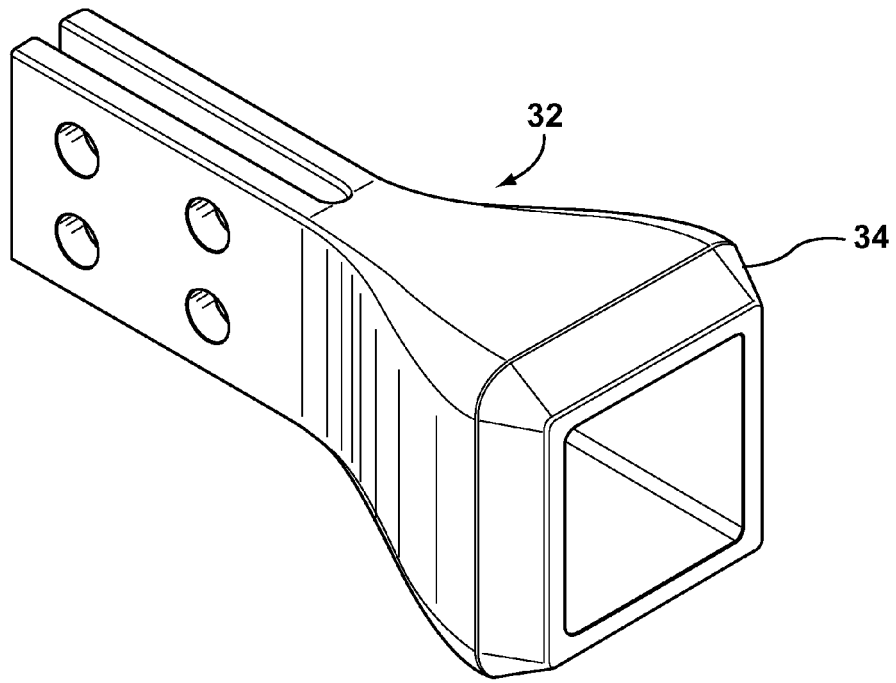
FIG. 7 is a perspective view of a connector for use with a brace member having a rectangular cross-section.

For example, FIG. 6 illustrates a connector 28 having a first end 30 for connecting with an oval-shaped HSS. FIG. 7 illustrates a connector 32 having a first end 34 for connecting with a square-shaped HSS brace member.

Figure 8A:
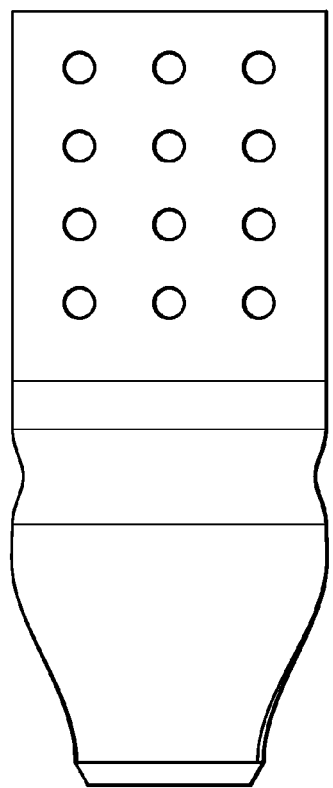
FIGS. 8A, 8B, 8C are a side view, bottom view and perspective view, respectively, of a connector having a flexural plastic hinge portion.
Figure 8B:
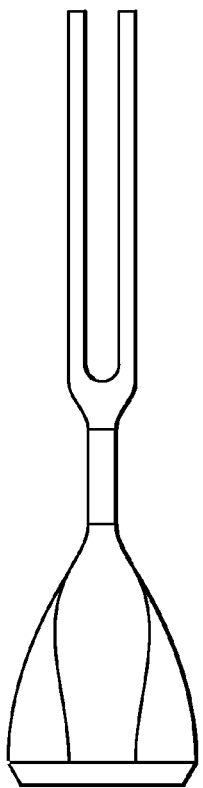
Figure 8C:
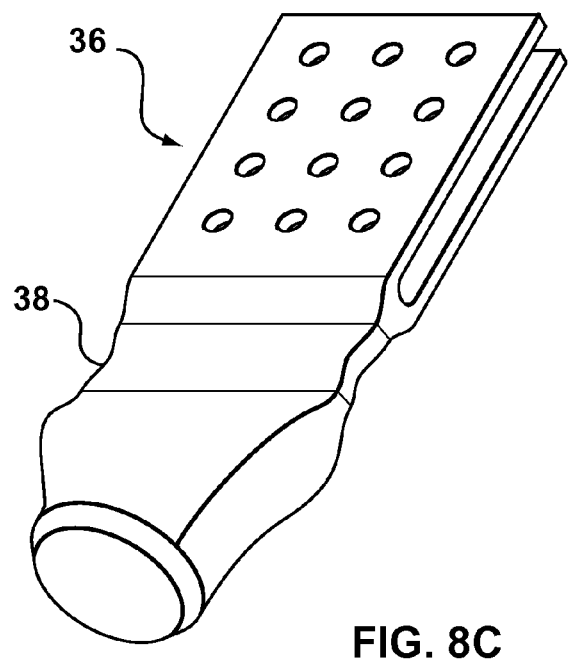

As shown in FIGS. 8A, 8B and 8C, another embodiment of the connector 36 can include a flexural plastic hinge portion 38 which is spaced away from the gusset plate. This allows the formation of a flexural plastic hinge, induced during compressive brace buckling, to occur in the cast connector 36 rather than in the connected gusset plate, thereby preserving the gusset plate and the beam-column intersection in the event of severe seismic conditions.

Figure 9A:
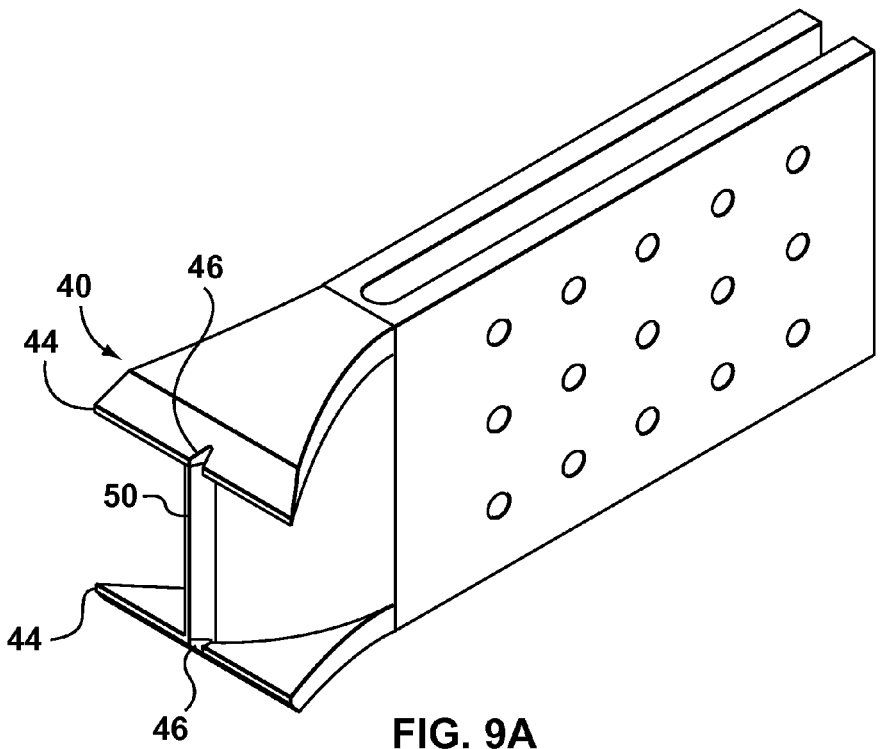
FIGS. 9A and 9B are perspective views of a connector for use with a W-section brace member.
Figure 9B:
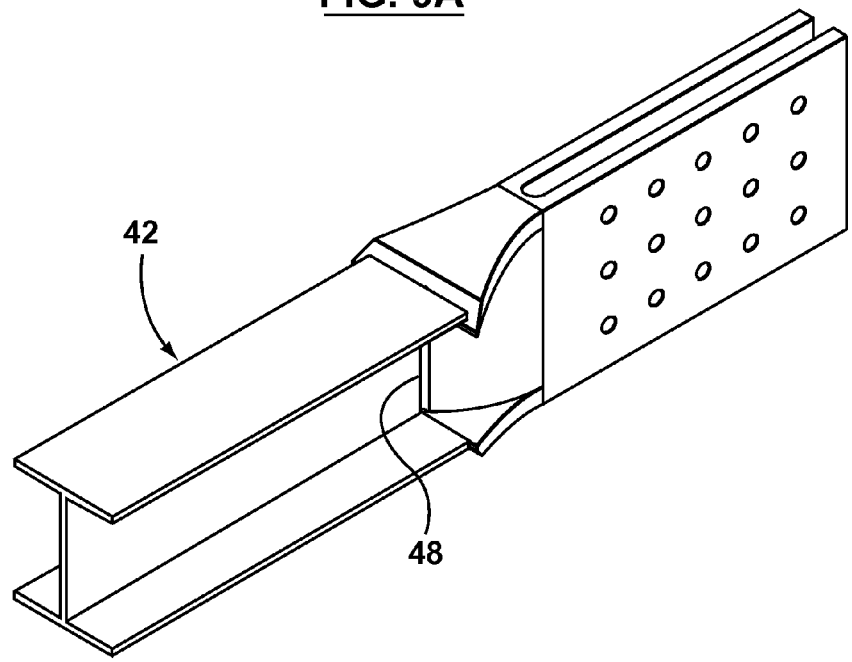

Referring to FIGS. 9A and 9B, a further embodiment of the connector of the present invention is particularly designed for use in association with a W-section brace member. In this case, the connector will have a corresponding W-section first end 40 that is adapted to be welded to the W-section brace member 42. In particular, the end 40 includes opposing bevelled edges 44 having a generally V-shaped groove 46 for receiving a web portion 48 of the brace member 42, and the end 40 further includes a web bevelled edge 50 for receiving the web portion 48. The V-shaped groove 46 acts to align and center the first end 40 with the brace member 42. The bevelled edges 44 and 50 enable a complete joint penetration weld to be made between the first end 40 with the brace member 42 for brace members of varying flange and web thicknesses.

It will be appreciated by those skilled in the art that the connectors of the present invention may be cast from various materials. It will be particularly useful to cast these connectors in steel. Also, different alloys and different types of steel may be used for the casting depending on the properties that are required for the particular application.

EXAMPLE

HSS brace members having an outer diameter of 168 mm were selected as an example for use with a connector in accordance with the present invention. The HSS brace members had an outer diameter of 168 mm, and different wall thicknesses. Such brace members are readily available from most steel tube manufacturers as this is a common pipe size. Further, the nominal radius of gyration for most of the available 168 mm tubes provides slenderness ratios that are below 200 at typical brace member lengths (a requirement for tension-compression braces). Finally, the yield capacity of 168 mm diameter tube ranges from approximately 550 to 3,000 kN (125 to 675 kip), depending on the wall thickness and steel grade. This gives the end user of the connector the ability to provide the appropriate level of lateral strength to each storey of a medium-rise structure while specifying the same cast connector.

The bolted end of the casting was designed to resist the highest probable yield strength of the thickest walled 168 mm CHS brace members that are typically available in North America: HSS 168×13 CAN/CSA-G40.20/G40.21 Grade 350W and HSS 6.625×0.500 ASTM A500 Grade C. This was achieved using 12 1-inch diameter ASTM A490 bolts for connection to a 30 mm gusset plate. The 12 pretensioned high-strength bolts provide sufficient slip resistance (assuming a blast cleaned faying surface) to carry the probable yield strength of the largest available 168 mm HSS. While a slip-critical connection is not specifically required in certain regulatory codes (unlike the use of pretensioned bolts), slip-critical connections perform better under cyclic loading regimes and are preferred in seismic applications. Further, increasing the number of bolts beyond the number that would be required to satisfy the bolt shearing design requirement ensures that the connector will remain virtually fully elastic in the bolt region. This could allow for reuse of the connector after a seismic event. In practice, the end user of the connector can specify the number of bolts to use based on the strength of the connected tube. The end user also has the option of cutting off the extra length of the connector tab for aesthetic purposes, if so desired.

Design of the casting between pre-determined boundary conditions was carried out using 3-dimensional solid modeling software with consideration for the flow of force though the connector and bearing in mind the limitations of casting manufacturing. For sand casting, the steel casting process most commonly used for structural engineering-sized components, and the process used for the manufacture of the connector prototypes, transitional geometry is kept smooth to ensure quality casting. Further, the casting's geometry should be conducive to directional solidification, thereby reducing the need for risering and other special and costly casting considerations.

As designing a component that can be cast soundly is paramount, iterations of stress design followed by foundry analysis is generally required, with recommendations being made by the foundry to improve solidification of the finished product. For the cast connector of the present example, foundry suggestions resulted in an 18% increase in the connector's mass.

Figure 10A:
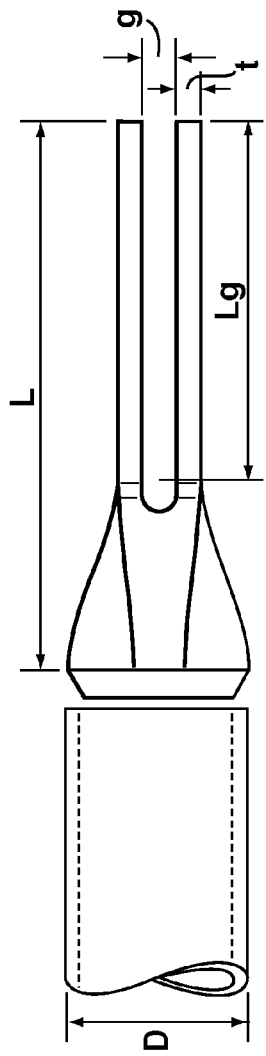
FIG. 10A is a top view of a connector and a brace member and FIG. 10B is a side view of the connector.
Figure 10B:
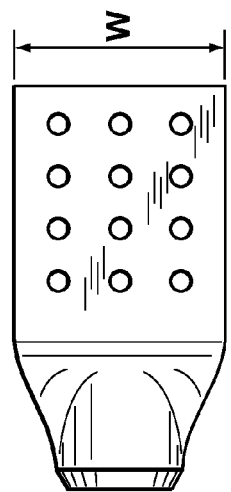

With reference to FIGS. 10A and 10B, the dimensions of the example connector are as follows:

Outer Diameter=D=168 mm
Length=L=510 mm
Maximum Gusset Length=$L_g$=330 mm
Gap=g=31 mm
Tab Thickness=t=23 mm
Tab Width=W=282 mm In concentrically braced frames, the brace member itself is the energy-absorbing element. Therefore, according to the principles of capacity design, the cast connector preferably remains elastic during tensile yielding of the brace member, buckling of the brace, or plastic hinging of the brace at midspan and at the two brace ends, due to overall or local inelastic buckling. The elastic behavior of the connector was established using finite element stress analysis during the design process of the prototype connector.

A solid modeling software package was used for the 3-dimensional design of the example connector. This model was forwarded to the foundry for their use in producing the pattern from which the sand moulds for the prototypes were made. For the purposes of finite element stress analysis, the connector model was modified to include a complete joint penetration groove weld between a 336 mm long (2 diameters) HSS 168×13 brace member of nominal diameter and thickness and the cast connector. Because of symmetry, finite element modeling of only a quarter of the assembly was required. The geometry of the part was exported directly into finite element analysis software. Solid bodies were meshed using higher order 3-dimensional tetrahedral solid elements, with each element defined by 10 nodes having three degrees of freedom at each node. These elements have quadratic displacement behavior and are best suited for modeling solid bodies that are curved or have irregular boundaries. Symmetry boundary conditions were required on three faces of the model such that the finite element model analyzed represented a full brace-connector assembly. As the gusset plate to which the connector bolts keeps the cast connector tabs from moving inward, a "compression only" boundary condition was applied to the inside face of the connector tab. Finally, displacements were applied to the internal faces of the 27-mm diameter bolt holes over a width of 25.4 mm (1-inch) to reproduce the effects of bolt bearing. It is important to note that the aforementioned boundary conditions do not permit overall brace buckling. The boundary conditions do, however, permit symmetric local buckling of the circular brace member in the example provided. As a result, the stresses produced during finite element analysis for compressive loading represented an upper bound on those that would actually be present in the connector during overall brace buckling. Further, as linear strain hardening was assumed for the cast material, stresses and deformations calculated that are beyond yielding of the casting are conservatively large.

Non-linear analysis was carried out by applying incremental displacements to the bearing faces of the bolt holes. In reality, the bolts are pretensioned resulting in load transfer through distributed frictional stresses between the cast tabs and the gusset plate, however, application of displacement in this manner adequately emulated static displacement-control loading of the connector assembly and also produced conservatively large stress concentrations at the bolt holes. Non-linear material properties were considered and geometrical non-linearities were taken into account by allowing large deformations, which also permitted shape change during loading. Reduced integration was used for the formulation of the local stiffness matrix of each element.

Figure 11:
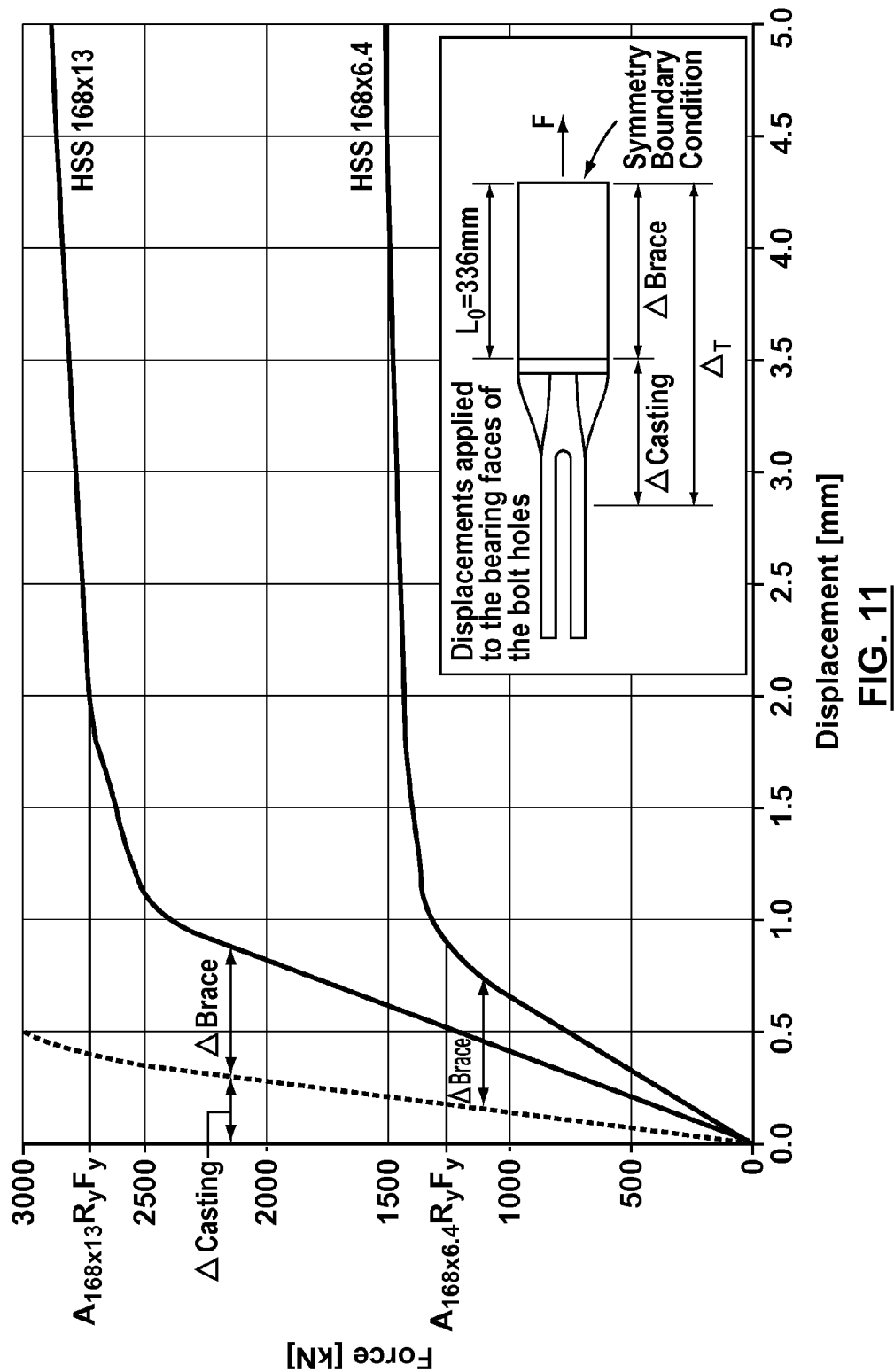
FIG. 11 is a tensile load-deformation plot for both a thin-walled and thick-walled brace-connector assembly.

Finite element analysis confirmed that when the brace assembly was loaded, inelastic deformations were localized in the brace member up to the probable yield capacity of the brace as shown in FIG. 11. Further, finite element stress analysis showed that when a tensile or compressive deformation was applied to the connector that caused a brace force corresponding to the design yield force, $AR_yF_y$, stresses in the casting were generally below the cast steel nominal yield stress of 345 MPa. Stresses only exceeded 345 MPa in the weld region, which was both expected and acceptable as the weld metal will exhibit higher strength levels than were accounted for in the finite element analysis. The stress distribution in the tubular brace was uniform at a very small distance from the welded connection, showing none of the shear-lag issues associated with the typical weld fabricated slotted tube-to-gusset connections.

Figure 12A:
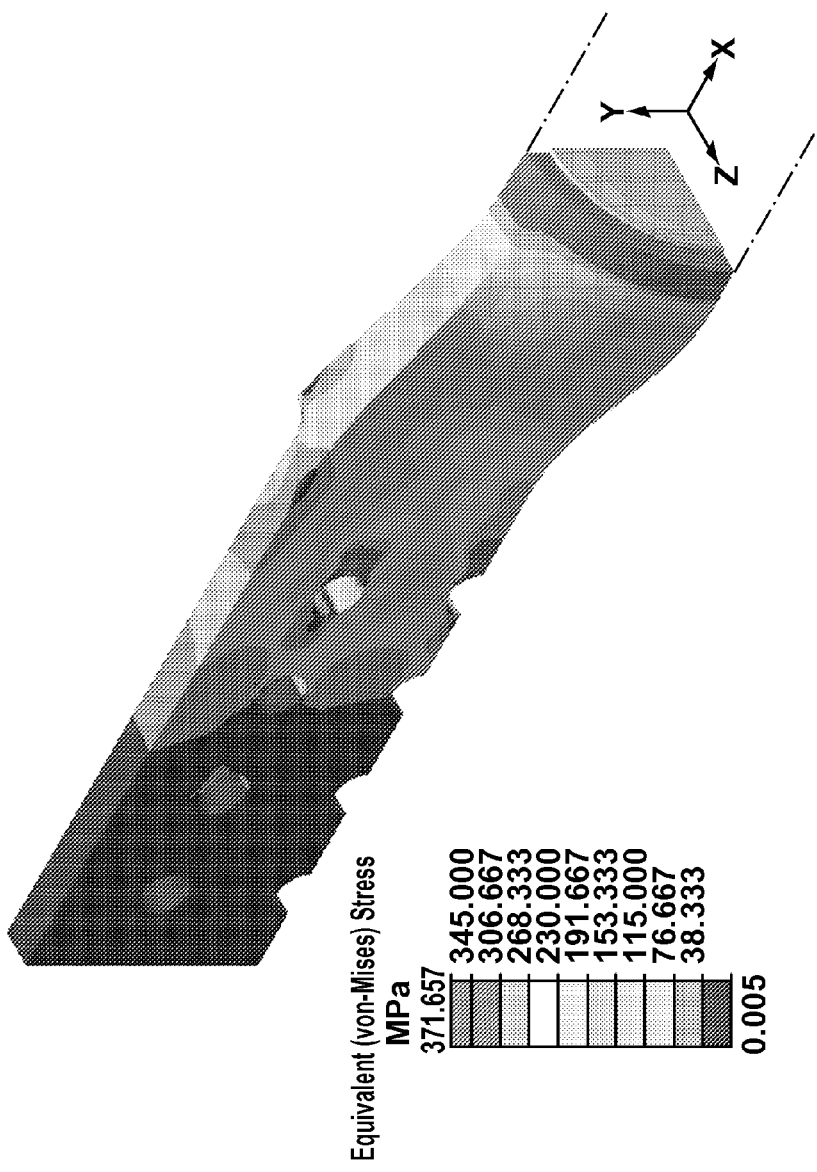
FIG. 12 illustrate modelled stresses in a connector and weld due to compressive yielding of a brace member.
Figure 12B:
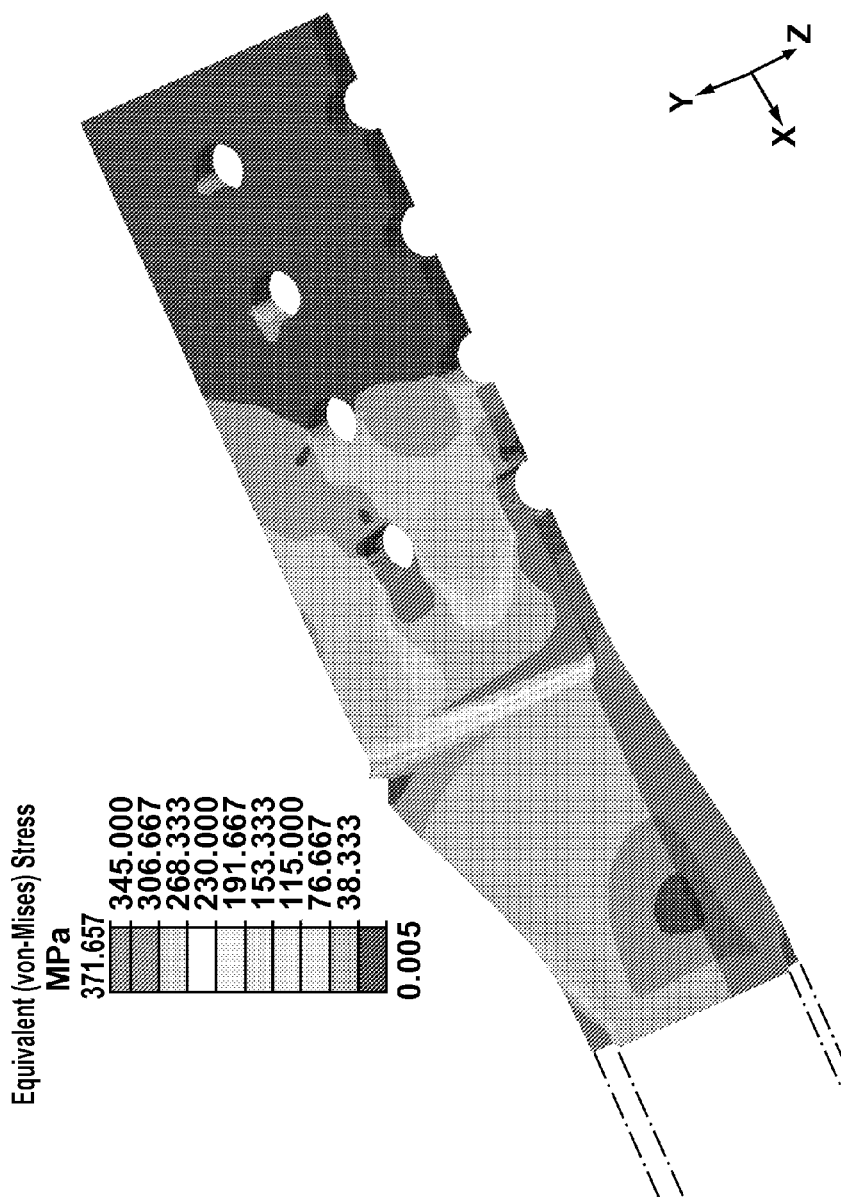
Figure 13A:
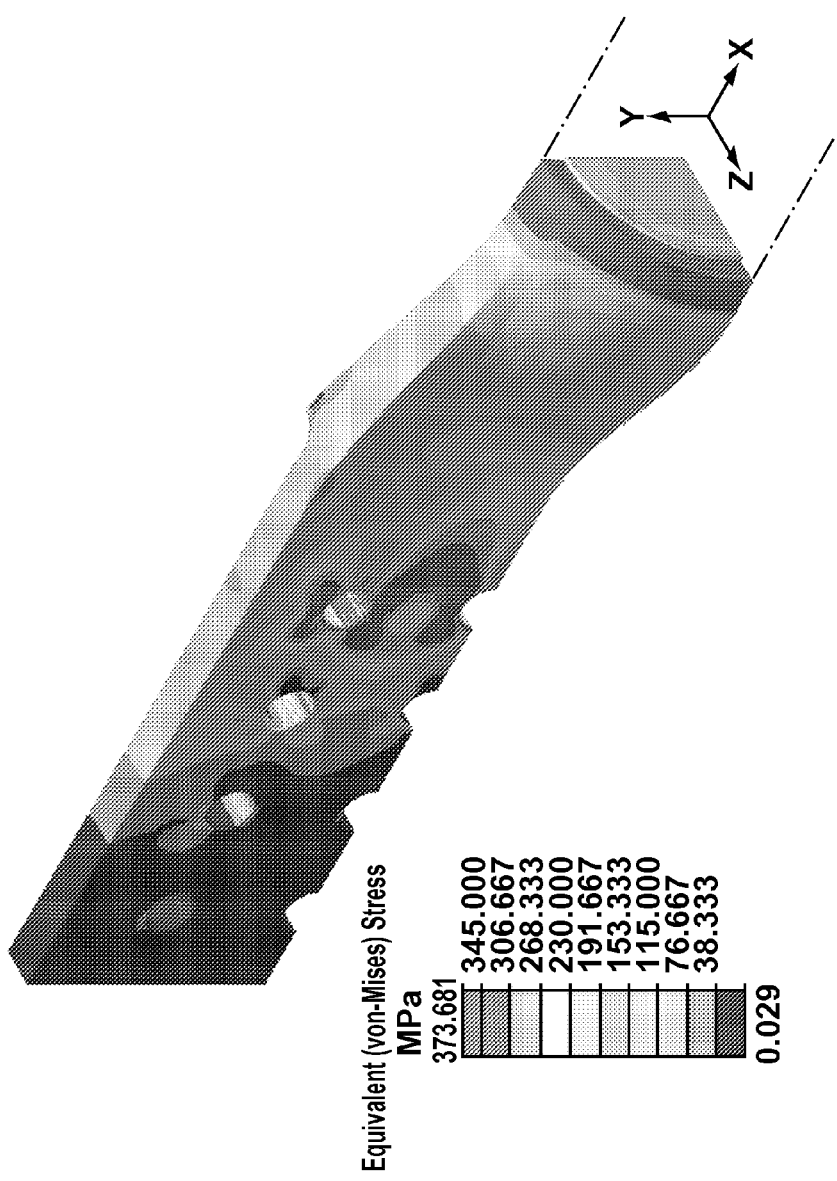
FIG. 13 illustrate modelled stresses in a connector and weld due to tensile yielding of a brace member.
Figure 13B:
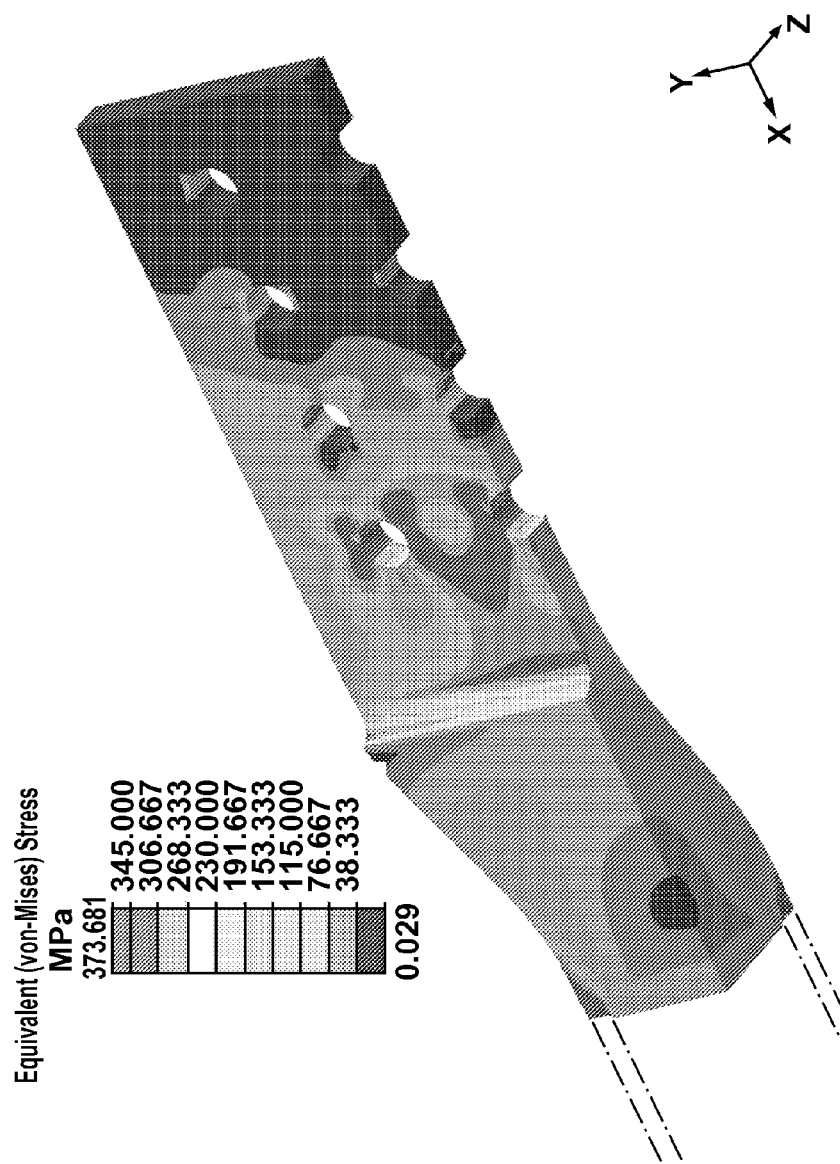

FIGS. 12A and 12B illustrate modelled equivalent (von-Mises) stresses in the connector and weld due to compressive yielding of a HSS 168×13 brace that is supported against overall buckling. FIGS. 13A and 13B illustrate modelled equivalent (von-Mises) stresses in the connector and weld due to tensile yielding of a HSS 168×13 brace.

Prototype cast steel connectors were manufactured with steel produced to ASTM A958 Grade SC8620 Class 80/50. This cast material has a chemical composition similar to that of a standard wrought steel grade and is considered a weldable base metal according to CSA W59 provided that the silicon content of the casting does not exceed 0.55% by weight. Material produced to this specification has a minimum yield stress of 345 MPa, a minimum ultimate tensile strength of 550 MPa, a minimum elongation of 22%, and a reduction in area of 35% in 50 mm. An additional Charpy V-Notch (CVN) impact test value requirement of 27 Joules (20 ft·lb) at −20° C. (−4° F.) was specified to ensure the connection had a suitable toughness at the weld region between the connector and the brace. This exceeds the general toughness requirement for energy-dissipating elements or welded parts, but more closely corresponds with the CVN requirement for the weld filler material required for dynamically loaded connections.

With respect to welding procedure, a suitable protocol was prepared for a CJP groove weld from one side on steel backing with a 60 degree vee or bevel joint having a 3 mm root gap.

Proof-of-concept laboratory testing consisted of pseudo-dynamic testing and static tensile testing of connector-brace assemblies as well as destructive examination of a cast connector. Test results from static and pseudo-dynamic testing of concentrically loaded brace-connector assemblies demonstrated that the use of a cast steel connector is a viable means of connecting to tubular brace members for seismic (or even static) applications. Correlation between laboratory measurements and the finite element results served to validate the finite element modeling conducted for the purpose of designing the connector.

It will be appreciated that the above description is related to the invention by way of example only. Many variations on the invention will be obvious to those skilled in the art and such obvious variations are within the scope of the invention as described herein whether or not expressly described.

What is claimed is:

1. A cast structural connector connectable to a structural frame being connected to at least one gusset plate at a junction in the structural frame where a corner is formed in the structural frame and a brace assembly including a brace member comprising:
   (a) a first and configured to receive the brace member, said first end being formed of a single solid piece that is devoid of holes, and said first end having a single continuous gradual sloping bevel with a distal end having dimensions equal to or smaller than the dimensions of the brace member formed therein, said bevel extending directly from an outer surface of the first end, the bevel fitting partially within the brace member so that at least a portion of the bevel provides weld volume between the brace member and the bevel of the first end, and said bevel being of an angle that is selected to provide sufficient weld volume for a complete joint penetration welding connection between the first end and the brace member to develop the axial strength of the brace member to withstand loading conditions, said bevel being formed to be connectable with brace members of varying thicknesses and to facilitate alignment and centering with the brace member;
   (b) a second end incorporating two plates separated by a gap, said second end being fixable to the gusset plate when said gusset plate is disposed between the two plates of the second end and such fixation is by means of one or more bolt connectors fitted into and through a plurality of corresponding holes in each of the two plates of the second end and in the gusset plate, said bolt connectors connecting the two plates of the second end and the gusset plate in a manner that forms a gap between at least one of two plates of the second end and the gusset plate such that a flexural plastic hinge occurs in the at least one gusset plate during compressive buckling; and
   (c) an intermediate portion disposed between the first end and second end that provides for a transmission of forces, said intermediate portion forming a gradual slope from the first end to the second and being of a greater circumference where the intermediate portion is in contact with the first end than where the intermediate portion is in contact with the second end, and the first end, second end and the intermediate portion being disposed within an axis defined by the brace member;
   whereby the connector is operable in applications that include seismic-resistant bracing applications so that the brace member absorbs energy and the connector remains elastic during tensile yielding and compressive buckling of the brace member.

2. The connector of claim 1 wherein the brace member is a hollow structural section having outside dimensions and inside dimensions and wherein the bevel is disposed on the distal end of the first end, and the distal end having dimensions less than or equal to the inside dimensions of the hollow structural section brace member so that the distal end bevel of the first end abuts to, or fits partially within, the hollow structural section brace member when the first end receives the hollow structural section brace member.

3. The connector of claim 2 wherein the hollow structural section has a cross-section that is generally circular, rectangular, square, oval, or elliptical.

4. The connector of claim 3 wherein the bevel is configured to receive a plurality of different hollow structural sections of different inside dimensions and generally equal outside dimensions.

5. The connector of claim 1 wherein the intermediate portion is sloped between the first end and the second and to improve castability and allow for the gradual dispersion of forces between the brace member and an end connection.

6. The connector of claim 1 wherein the second end is bolted or welded directly to the structural frame.

7. The connector of claim 1 for use in static, quasi-static or dynamic applications.

8. The connector of claim 1 wherein the angle of the bevel is selected so that the complete joint penetration weld produces a weld portion that is of sufficient volume to effect a good weld to develop full axial strength of the brace member in severe seismic loading conditions, and the bevel is approximately 45 to 60 degrees.

9. A cast structural connector connectable to a structural frame being connected to at least one gusset plate at a junction in the structural frame where a corner is formed in the structural frame and a hollow structural section having outside dimensions and inside dimensions comprising:
   (a) a first end being formed of a sing solid piece that is devoid of holes and having therein a bevel extending directly from an outer surface of the first end, said bevel being a single continuous gradual sloping bevel with a distal end having dimensions equal to or smaller than the inside dimensions of the hollow structural section and configured to partially fit within the hollow structural section so that a portion of the distal end of the bevel provides weld volume between the hollow structural section and the bevel of the first end, the first end being adapted to be welded to the hollow structural section so that the first end receiving the hollow structural section is connected to the hollow structural section by the welding, and the bevel being of an angle that is selected to provide sufficient weld volume for the welding connection between the first end and the hollow structural section to develop the axial strength of the hollow structural section to withstand loading conditions, said bevel being formed to be connectable with hollow structural sections of varying thicknesses and to facilitate alignment and centering with the hollow structural section;
   (b) a second end incorporating two plates separated by a gap, said second end being connectable to the gusset plate when said gusset plate is disposed between the two plates of the second end and such connection is by means of one or more bolt connectors fitted into and through a plurality of corresponding holes in each of the two plates of the second end and in the gusset plate, said bolt connectors connecting the two plates of the second end and the gusset plate in a manner that forms a gap between at least one of the two plates of the second end and the gusset plate such that a flexural plastic hinge occurs in the gusset plate during compressive buckling; and
   (c) an intermediate portion disposed between the first end and second end, the intermediate portion providing for a transmission of forces, said intermediate portion forming a gradual slope from the first end to the second end being of a greater circumference where the intermediate portion is in contact with the first end than where the intermediate portion is in contact with the second end, and the first end, second end and the intermediate portion being disposed within an axis defined by the brace member;

whereby the connector is operable in applications that include seismic-resistant bracing applications so that the connector remains elastic during tensile yielding and compressive buckling of the hollow structure connected to the connector.

10. The connector of claim 9 wherein the bevel enables complete joint penetration welding between the first end and the hollow structural section.

11. The connector of claim 9 wherein the combination of the hollow structural section, the connector and the second end connection act as a brace within the structural frame.

12. The connector of claim 9 wherein the second end is bolted or welded directly to the structural frame.

13. The connector of claim 9 wherein the second end includes a plurality of holes drilled therein for receiving a corresponding plurality of bolts and the second end is operable to be bolted to the gusset plate, the gusset plate being connected to the structural frame.

14. A structural brace assembly for use in association with a structural frame having a gusset plate connected at a junction in the structural frame where a corner is formed in the structural frame, comprising:
(a) a brace member connectable to the gusset plate of the structural frame; and
(b) a cast connector, the cast connector including:
(i) a first end configured to receive the brace member, said first end being formed of a single solid piece that is devoid of holes, and said first end having a single continuous gradual sloping bevel with a distal end having dimensions equal to or smaller than the dimensions of the brace member formed therein, said bevel extending directly from an outer surface of the first end, the bevel fitting partially within the brace member so that at least a portion of the bevel provides weld volume between the brace member and the bevel of the first end, said bevel being of an angle that is selected to provide sufficient weld volume for the welding between the first end and the brace member to develop the axial strength of the brace member to withstand loading conditions, said bevel being formed to be connectable with brace members of varying thicknesses and to facilitate alignment and centering with the brace member;
(ii) a second end incorporating two plates separated by a gap, said second end being connectable to the gusset plate when said gusset plate is disposed between the two plates of the second end and such connection is by means of one or more bolt connectors fitted into and through a plurality of holes in each of the two plates of the second end and in the gusset plate, said bolt connectors connecting the two plates of the second end and the gusset plate in a manner that forms a gap between at least one of the two plates of the second end and the gusset plate such that a flexural plastic hinge occurs in the gusset plate during compressive buckling; and
(iii) an intermediate portion disposed between the first end and second end, the intermediate portion providing for a transmission of forces, said intermediate portion forming a gradual slope from the first end to the second end being of a greater circumference where the intermediate portion is in contact with the first end than where the intermediate portion is in contact with the second end, and the first end, second end and the intermediate portion being disposed within an axis defined by the brace member;
whereby the connector is operable in applications that include seismic-resistant bracing applications so that the brace member absorbs energy and the cast connector remains elastic during tensile yielding and compressive buckling of the brace member.

15. The brace assembly of claim 14 wherein the bevel enables complete joint penetration welding between the first end and the brace member.

16. The brace assembly of claim 14 wherein the brace member is a hollow structural section or a W-section.

17. The brace assembly of claim 14 further comprising a standard fabricated end connection for connecting the brace assembly to the structural frame.

18. The brace assembly of claim 14 wherein the second end is welded to the gusset plate or connected by means of bolting.

19. A cast structural connector connectable to a brace member and a gusset plate comprising:
(a) a first end configured to receive the brace member, said first end being formed of a single solid piece that is devoid of holes, end said first end having a single continuous gradual sloping bevel with a distal end having dimensions equal to or smaller than the dimensions of the brace member formed therein, said bevel extending directly from an outer surface of the first end, the bevel fitting partially within the brace member so that at least a portion of the bevel provides weld volume between the brace member and the bevel of the first end, said bevel being of an angle that is selected to provide sufficient weld volume for the welding between the first end and the brace member to develop the axial strength of the brace member to withstand loading conditions, said bevel being formed to be connectable with brace members of varying thicknesses and to facilitate alignment end centering with the brace member;
(b) a second end incorporating two plates separated by a gap, said second end being fixable to the gusset plate when said gusset plate is disposed between the two plates of the second end and such fixation is by means of one or more bolt connectors fitted into and through a plurality of corresponding holes in each of the two plates of the second end and in the gusset plate, said bolt connectors connecting the two plates of the second end and the gusset plate in a manner that forms a gap between at least one of the of the second end and the gusset plate such that a flexural plastic hinge occurs in the gusset plate during compressive buckling; and
(c) a sloped intermediate portion between the first end and the second end, the intermediate portion providing for a transmission of forces, said intermediate portion forming a gradual slope from the first end to the second end being of a greater circumference where the intermediate portion is in contact with the first end than where the intermediate portion is in contact with the second end, and the first end, second end and the intermediate portion being, disposed within an axis defined by the brace member;
whereby the connector is operable in applications that include seismic-resistant bracing applications so that the connector remains elastic during tensile yielding and compressive buckling of the brace member connected to the connector.

20. A cast structural connector for use in association with a brace member, said connector comprising:
(a) a first end configured to receive the brace member, said first end being formed of a single solid piece that is devoid of holes, and said first end having a single continuous gradual sloping bevel with a distal end having dimensions equal to or smaller than the dimensions of the brace member formed therein, said bevel extending directly from an outer surface of the first end, the bevel fitting partially within the brace member, and forming a space between the end of the brace member and the edge of the bevel in contact with the first end, so as to be devoid of any whole and direct abutment with any end of the brace member, so that at least a portion of the bevel provides weld volume between the brace member and the bevel of the first end, said bevel being of an angle that is selected to provide sufficient weld volume for the welding between the first end and the brace member to develop the axial strength of the brace member to withstand loading conditions, said bevel being formed to be connectable with brace members of varying thicknesses and to facilitate alignment and centering with the brace member, and the first end being disposed within an axis defined by the brace member;

(b) a second end incorporating two plates separated by a gap, said second end having means to be fixed to a connector element disposed between the two plates of the second end by means of one or more bolt connectors fitted into and through a plurality of holes in each of the two plates of the second end and in the connector element; and (c) a sloped intermediate portion between the first end and the second end, the intermediate portion providing for a transmission of forces, said intermediate portion forming a gradual slope from the first end to the second end being of a greater circumference where the intermediate portion is in contact with the first end than were the intermediate portion is in contact with the second end, and the first end, second end and the intermediate portion being disposed within an axis defined by the brace member;

whereby the connector is operable in applications that include seismic-resistant bracing applications so that the connector remains elastic during tensile yielding and compressive buckling of the brace member connected to the connector.

21. A seismic-resistant bracing cast structural connector for use in association with a brace member and a gusset plate comprising:

(a) a first end configured to receive the brace member, said first end being formed of a single solid piece that is devoid of holes, and said first end having a single continuous gradual sloping bevel with a distal end having dimensions equal to or smaller than the dimensions of the brace member formed therein, said bevel extending directly from en outer surface of the first end, the bevel fitting partially within the brace member so that at least a portion of the bevel provides weld volume between the brace member and the bevel of the first end, said bevel being of an angle that is selected to provide sufficient weld volume for the welding between the first end and the brace member to develop the axial strength of the brace member to withstand loading conditions, said bevel being formed to be connectable with brace members of varying thicknesses and to facilitate alignment and centering with the brace member;

(b) a second end incorporating two plates separated by a gap, said second end being fixable to the gusset when said gusset plate is disposed between the two plates of the second end and such fixation is by means of one or more bolt connectors fitted into and through a plurality of holes in each of the two plates of the second end and in the gusset plate, said bolt connectors connecting the two plates of the second end and the gusset plate in a manner that forms a gap between at least one of the two plates of the second end and the gusset plate such that a flexural plastic hinge occurs in the gusset plate during compressive buckling; and (c) a sloped intermediate portion between the first end and the second end, the intermediate portion providing for a transmission of forces, said intermediate portion forming a gradual slope from the first end to the second end being of a greater circumference where the intermediate portion is in contact with the first end than where the intermediate portion is in contact with the second end, and the first end, second end and the intermediate portion being disposed within an axis defined by the brace member;

whereby the connector is operable in applications that include seismic-resistant bracing applications so that the connector remains elastic during tensile yielding and compressive buckling of the brace member connected to the connector.

* * * * *